United States Patent
Churchwell, II et al.

(10) Patent No.: US 10,518,607 B2
(45) Date of Patent: Dec. 31, 2019

(54) POLLUTION EVENT DETECTION

(71) Applicant: Ford Global Technologies, LLC, Dearborn, MI (US)

(72) Inventors: Howard E. Churchwell, II, Monroe, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 235 days.

(21) Appl. No.: 15/688,115

(22) Filed: Aug. 28, 2017

(65) Prior Publication Data

US 2019/0061467 A1   Feb. 28, 2019

(51) Int. Cl.
*B60H 1/00* (2006.01)

(52) U.S. Cl.
CPC ..... *B60H 1/00757* (2013.01); *B60H 1/00771* (2013.01); *B60H 1/00792* (2013.01); *B60H 1/00814* (2013.01)

(58) Field of Classification Search
CPC ............ B60H 1/00757; B60H 1/00814; B60H 1/00792; B60H 1/00771
USPC .......................................................... 701/45
See application file for complete search history.

(56) References Cited

U.S. PATENT DOCUMENTS

| 8,831,829 B2 | 9/2014 | Freienstein et al. |
| 2004/0015351 A1* | 1/2004 | Gandhi ............... G10L 15/01 704/240 |
| 2015/0112678 A1* | 4/2015 | Binks ................. G10L 25/48 704/236 |
| 2016/0068156 A1* | 3/2016 | Horii ................. B60W 30/00 701/28 |

FOREIGN PATENT DOCUMENTS

| CN | 103808723 A | 5/2014 |
| DE | 102009041487 A1 | 5/2010 |
| JP | 2004331019 A | 11/2004 |
| KR | 2007-0062661 A * | 6/2007 |
| KR | 20070062661 A | 6/2007 |
| KR | 2009-0122168 A * | 11/2009 |
| KR | 20090122168 A | 11/2009 |

\* cited by examiner

*Primary Examiner* — Muhammad Shafi
(74) *Attorney, Agent, or Firm* — Frank A. MacKenzie; Bejin Bieneman PLC

(57) ABSTRACT

A sound of a second vehicle engine is detected. Upon predicting a pollution event by comparing the detected sound to a stored sound model, a countermeasure is actuated in a first vehicle.

20 Claims, 2 Drawing Sheets

POLLUTION EVENT DETECTION

BACKGROUND

Vehicles with internal combustion engines, e.g., diesel engines, can release pollutants, e.g., soot, ash, carbon monoxide, etc., that can be visible and/or noxious. Further, vehicle exhaust controls that govern the release of contaminants in a vehicle exhaust can be modified or eliminated, and/or a vehicle can be operated in a fashion to increase the vehicle's release of pollutants. Increased pollutants from a vehicle so modified and/or operated can be an irritant to users operating other vehicles in a vicinity of the polluting vehicle. However, current vehicles lack ways to detect and counteract such a polluting vehicle.

DETAILED DESCRIPTION

Figure 1:
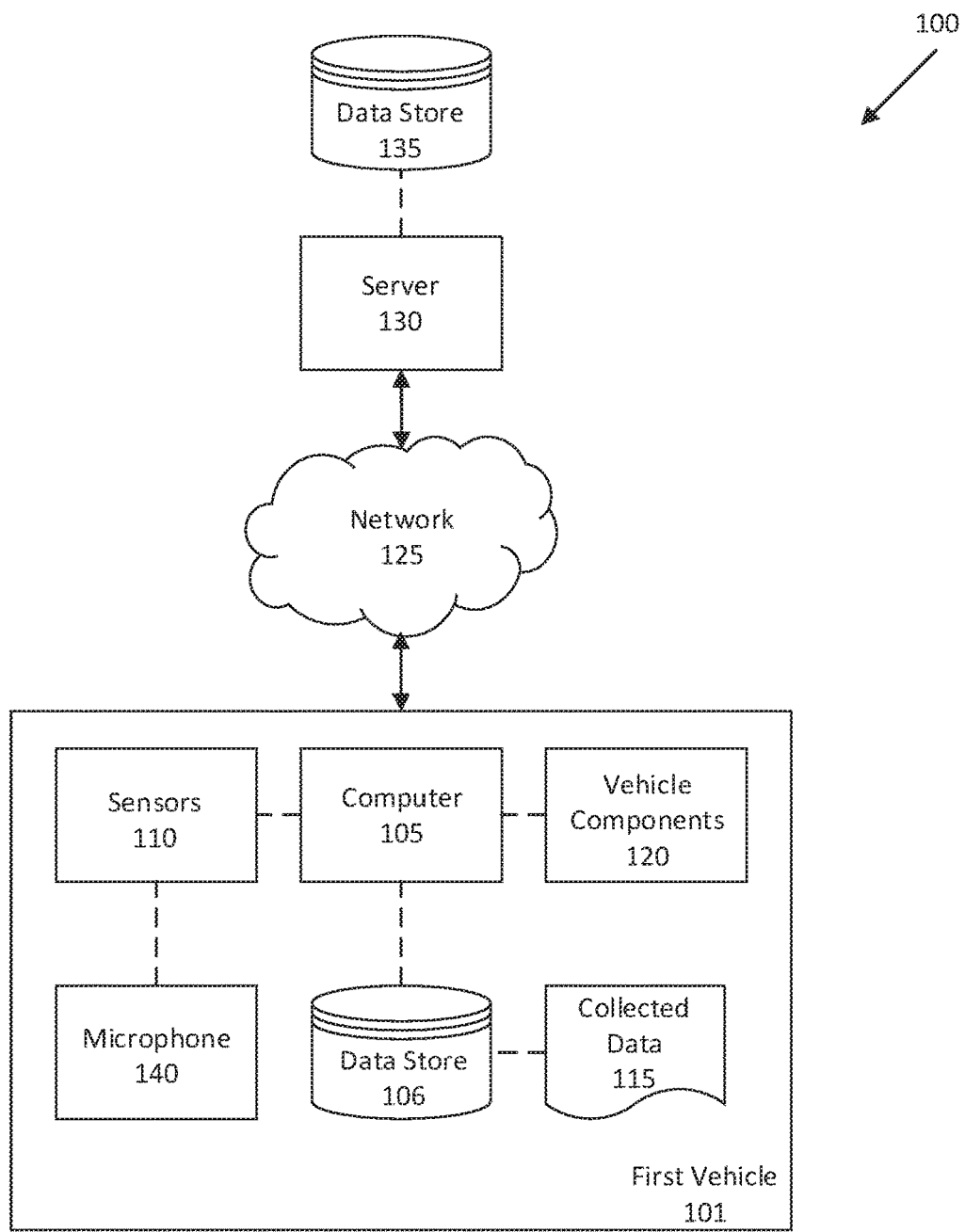
FIG. 1 is a block diagram of an example vehicle pollution detection system.

A system includes a computer programmed to detect a sound of a second vehicle engine, and upon predicting a pollution event by comparing the detected sound to a stored sound model, actuate a countermeasure in a first vehicle.

The computer can be further programmed to identify an ambient sound external to the first vehicle and filtering the ambient sound from the detected sound. The ambient sound includes weather sound.

The computer can be further programmed to predict the pollution event by analyzing an image provided by a vehicle image sensor.

The countermeasure includes actuating one or more of windows and a climate control system.

The computer can be further programmed to detect the sound according to sound characteristics. The computer can be further programmed to determine the stored sound model according to the sound characteristics of the detected sound, and actuating the countermeasure by comparing the detected sound to a threshold provided by the stored sound model.

The computer can be further programmed to determine a distance between the first vehicle and the second vehicle according to the sound characteristics of the detected sound, and to actuate the countermeasure when the distance is within a specified distance.

The computer can be further programmed to actuate the countermeasure when a vehicle speed of the first vehicle is below a speed threshold.

The first vehicle includes a plurality of microphones, and the computer is further programmed to, at each microphone, detect the sound and triangulate a location of the pollution event via the sound detected at each microphone.

A method includes detecting a sound of a second vehicle engine, and upon predicting a pollution event by comparing the detected sound to a stored sound model, actuating a countermeasure in a first vehicle.

The method can further include identifying an ambient sound external to the first vehicle and filtering the ambient sound from the detected sound. The ambient sound includes weather sounds.

The method can further include analyzing an image provided by a vehicle image sensor.

The countermeasure includes actuating one or more of windows and a climate control system.

The method can further include detecting the sound according to sound characteristics. The method can further include determining the stored sound model according to the sound characteristics of the detected sound, and actuating the countermeasure by comparing the detected sound to a threshold provided by the stored sound model.

The method can further include determining a distance between the first vehicle and the second vehicle according to the sound characteristics of the detected sound, and actuating the countermeasure when the distance is within a specified distance.

The method can further include actuating the countermeasure when a vehicle speed of the first vehicle is below a speed threshold.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100, including a computer 105 programmed to detect a pollution event from a second vehicle and actuate a countermeasure in a first vehicle 101. A pollution event in the context of this disclosure means the emission of exhaust from the second vehicle where the exhaust includes one or more contaminants at or above a predetermined threshold level. A pollution event can be detected by one or more physical properties of the exhaust. For example, the exhaust can be determined to have a soot content above a predetermined threshold based on a color and/or opacity of the exhaust as detected in a camera image, e.g., exhaust colors can include black, white, blue/grey, etc., and opacity can include, e.g., transparent, translucent, or opaque, of the exhaust. Continuing this example, when the soot content is above the threshold, the exhaust can be black and translucent. As another example, the exhaust may produce an odor, e.g., gasoline, diesel fuel, etc., that exceeds a threshold during the pollution event. As another example, the amount of exhaust, e.g., the size of the exhaust cloud, can exceed a threshold during the pollution event.

The computer 105 in the first vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle velocity, a vehicle trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

One of the sensors 110 can be a microphone 140, e.g., a dynamic microphone, a condenser microphone, a piezoelectric microphone, etc. The microphone 140 can detect the sound external to a cabin of the first vehicle 101 and convert the sound into a signal that is sent to the computer 105. Based on the signal, the computer 105 can identify the sound, e.g., as ambient sound and/or the engine sound of the second vehicle.

The first vehicle 101 can include a vehicle image sensor 110 that can capture images of the second vehicle. The vehicle image sensor 110 may be supported by the first vehicle 101 and may face away from the first vehicle 101 to detect objects external to and/or the environment surrounding the first vehicle 101. The vehicle image sensor 110 can be a camera, a thermal imaging sensor, radar, LIDAR, etc. that can detect the pollution event. For example, the computer 105 can maintain a database of pollution events that can be compared to the pollution event detected by the vehicle image sensor 110. The computer 105 can predict the pollution event by analyzing the image provided by the vehicle image sensor 110, e.g., the computer 105 can predict a pollution event by detecting soot content above the threshold from the second vehicle. As another example, the computer 105 can predict a pollution event based on characteristics of the second vehicle, e.g., smoke stacks, suspension lifts, etc.

Collected data 115 may include a variety of data collected in the first vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The first vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a climate control system, a plurality of windows, etc.

The first vehicle 101 can include a climate control system. The climate control system provides heating and/or cooling to the cabin of the first vehicle 101. The climate control system may be in communication with the environment external to the first vehicle 101, e.g., air can enter a passenger cabin from or exit the passenger cabin to the environment surrounding the first vehicle 101. Additionally, the climate control system may be engaged to a recirculate mode in which the climate control system is substantially closed to the environment, e.g., air is recirculated and remains in the passenger cabin. The computer 105 can actuate the climate control system to engage in the recirculate mode when the pollution event is detected.

The first vehicle 101 can include a plurality of windows. The computer 105 can actuate the windows from an open position to a closed position to prevent or alleviate pollution coming into the cabin of the first vehicle 101. When the computer 105 predicts the pollution event, the computer 105 can actuate the windows from the open position to the closed position.

The first vehicle 101 can include a plurality of microphones 140. Multiple microphones 140 mounted to different positions on a vehicle can detect sound from the second vehicle. The computer 105 can triangulate a location of the pollution event via the sound detected by each the plurality of microphones 140. Triangulating herein refers to the known technique of determining a location of a sound source, here also a predicted source of a pollution event, based on respective determined distances of detected sound from each microphone 140. The computer 105 can maintain a list of quadrants around the first vehicle 101 according to a three-dimensional or other coordinate system that can be mapped onto space around the vehicle body. For example, the computer 105 can maintain a list of quadrants according to substantially unique identifiers for each quadrant and/or descriptors, e.g., front-left, rear-right, etc. The computer 105 can determine the distance from each microphone 140 to the pollution event by comparing the amplitude, e.g., a larger amplitude is closer to the pollution event than a smaller amplitude, of the detected sound at each microphone 140, e.g., each microphone 140 may be assigned a set of coordinates. Based on the location of the pollution event, the computer 105 can actuate countermeasures on one or both sides of the first vehicle 101, e.g., when the pollution event is triangulated to one side of the first vehicle 101, the computer 105 can actuate the countermeasures on that side of the first vehicle 101.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

The computer 105 can identify an ambient sound external to the first vehicle 101. Ambient sound is sound around the first vehicle 101, e.g., environmental sounds caused by wind, precipitation, human voices, machinery, operating of other vehicles, etc. In other words, the ambient sound may be what is sometimes referred to as background sound. The ambient sound may change during operation of the first vehicle 101. For example, the ambient sound may change based on a speed of the first vehicle 101, traffic conditions, weather conditions, and/or environmental conditions, such as sounds made from people and/or animals. The ambient sound can include weather sounds. Weather sounds can result from weather conditions such as atmospheric conditions, e.g., wind, rain, thunder, etc., around the first vehicle 101. The weather conditions may contribute to the ambient sound around the first vehicle 101. For example, weather sounds, e.g., high winds, thunder, etc., around the first vehicle 101 may increase the ambient sound.

The computer 105 can detect a sound from an engine of the second vehicle. The engine of the second vehicle may produce a sound when the engine is operating, e.g., revving the engine of the second vehicle to wide open throttle, e.g., maximum level of fuel injected into the engine relative to the air pumped in by the engine. The sound includes sound characteristics, which are physical measurements of sound, or values derived therefrom, e.g., sound characteristics can include frequency, amplitude, sound pressure level (SPL), spectrum, envelope, etc. Sound characteristics thus are properties of a sound that can be analyzed to distinguish between different sources of sound. The microphones 140 can detect the sound based on the sound characteristics. The sound characteristics may be unique to specific engines, e.g., diesel engines may produce a different sound than gas engines, when the engine is revved, e.g., at wide open throttle. In other words, the detected sound may correspond to an engine type, e.g., diesel engine, gasoline engine, etc. The computer 105 can detect the sound according to the sound characteristics of the sound propagating from the engine of the second vehicle.

The computer 105 can filter, e.g., remove, the ambient sounds from the detected sounds. After detecting the detected sound, the computer 105 can, using known audio processing techniques, compare the ambient sound to the detected sound to filter the ambient sound. For example, the computer 105 can detect sound characteristics of the ambient sound in the detected sound. When the computer 105 identifies the ambient sound in the detected sound, the computer 105 can remove the ambient sound from the detected sound, e.g., can actuate an algorithm to introduce interfering sound that is out of phase with the ambient sound. As another example, the computer 105 can actuate an algorithm to reduce the amplitude of the ambient sound to reduce the volume of the ambient sound.

The computer 105 can compare the detected sound to stored sound models, e.g., a model of engine sounds that correspond to pollution events. A stored sound model is based on sound recorded at a known distance from a microphone 140; the sound can be recorded, for example, when an engine is at wide open throttle. A sound model includes sound characteristics, e.g., SPL, a frequency, an amplitude, envelop, etc., of sound waves over time. The computer 105 can maintain a list of the stored sound models according to the sound characteristics of the sound associated with different engines. The computer 105 can, using known processing techniques, compare the detected sound to the stored sound models to identify a pollution event. For example, the computer 105 can detect a sound, e.g., a frequency, SPL, envelop, etc., and can identify a stored sound model that that matches detected sound. For example, the computer 105 can compare a sound spectrum, e.g., SPL over frequency, of the detected sound to a sound spectrum of a stored sound model. As another example, the computer 105 can compare an envelope of the detected sound to an envelope of the stored sound model, e.g., the computer 105 can compare a sustain value of the envelopes of the detected sound and the stored sound model. The sustain level is a substantially constant sound level, e.g., a volume. The computer 105 can identify the sustain level via a counter to determine the length of the sustain level of the detected sound. The computer 105 can then compare the sustain level, e.g., the volume and duration, of the detected sound to the sustain level of the stored sound model.

The computer 105 can compare the sound characteristics of the detected sound to the sound characteristics of the stored sound model to determine a match between the detected sound and the sound model, e.g., the computer 105 can compare one or more sound characteristics of the detected sound to the corresponding sound characteristics of the stored sound model. The computer 105 can determine a measured value of each sound characteristic, e.g., each sound characteristic can have a unique measured value. The measured value can be based on measurement units of each sound characteristic, e.g., decibels for SPL, Hertz for frequency, volume for envelope, etc. The detected sound matches the stored sound models in the context of this disclosure when the measured value of a sound characteristic of the detected sound is within a predetermined range of the measured value of the corresponding sound characteristic of the stored sound model, e.g., the predetermined range can be +/−10% of the measured value of the sound characteristic of the stored sound model.

The computer 105 can predict a pollution event from a detected sound, an image of the second vehicle, or a combination thereof. For example, the computer 105 can predict a pollution event when the sound, e.g., the sound characteristics, of the engine from the second vehicle matches, or exceeds the threshold of, the stored sound model. As another example, the computer 105 can analyze an image of a second vehicle to predict a pollution event based on the exhaust of the second vehicle, e.g., whether the soot content exceeds the threshold, and/or the appearance of the second vehicle, e.g., whether the second vehicle has visible modifications to a powertrain component and/or an exhaust component. Additionally, or alternatively, the computer 105 can analyze both the image and the detected sound to predict a pollution event. In this situation, when the computer 105 detects a pollution event based on a signal from one of the microphones 140 and the vehicle image sensor 110, the computer 105 can actuate the other of the microphones 140 and the vehicle image sensor 110 to confirm the pollution event. For example, if the vehicle image sensor 110 detects a feature, e.g., a suspension lift, smokestacks, etc., on the second vehicle, the computer 105 can predict a pollution event and actuate the microphones 140 to detect sound characteristics from the engine of the second vehicle to confirm the pollution event. As another example, if the microphones 140 detect a sound, e.g., sound characteristics, above the threshold of a stored sound model, the computer 105 can actuate the vehicle image sensor 110 to detect the soot content in the exhaust from the second vehicle to confirm the pollution event.

The computer 105 can determine a distance between the second vehicle and the first vehicle 101 by detecting a sound from an engine of a second vehicle. Specifically, the computer 105 can identify the SPL of the sound from the engine of the second vehicle. The computer 105, can filter ambient noise from the detected sound, as explained above. When the computer 105 identifies the SPL of the sound from the second vehicle, the computer 105 can then compare the SPL to the stored sound models. The computer 105 can determine the distance between the first vehicle 101 and the second vehicle by applying the inverse square law, e.g., the SPL decreases by 6 decibels (dB) as the distance between the source and receiver is doubled. For example, if the SPL of the detected sound is 6 dB lower than the stored sound model, the computer 105 determines that the second vehicle is twice the distance from the first vehicle 101 as known distance in the stored sound model. Alternatively, the first vehicle 101 can include sensors 110, as set forth above, to determine the distance between the first vehicle 101 and the second vehicle. In this situation, when the vehicle image sensor 110 detects a second vehicle, the computer 105 can predict a pollution event based on an image of the second vehicle, as described above. Upon predicting the pollution event, the sensors 110 can determine the distance between the first vehicle 101 and the second vehicle.

After determining the distance between the second vehicle and the first vehicle 101, the computer 105 can compare the distance to a specified distance. The specified distance is a distance value stored in a memory of the computer 105, and is determined as a distance from the first vehicle 101, e.g., a radius from a center point or some other point within the vehicle, at which the sound, when the sound is at or within the specified distance, is approaching the first vehicle 101. The specified distance may be configurable based on a location of and/or environment surrounding the first vehicle 101. After predicting a pollution event, the computer 105 can actuate the countermeasure when the second vehicle is within the specified distance of the first vehicle 101. When the distance between the second vehicle and the first vehicle 101 is within a specified distance, the computer 105 can actuate the countermeasure.

The computer 105 can determine a speed of the first vehicle 101. The computer 105 can determine the speed of the first vehicle 101 according to data 115 available on a communication bus in the first vehicle 101. When the computer 105 receives the message, the computer 105 can compare the speed of the first vehicle 101 to a speed threshold. The speed threshold is a speed value stored in the memory of the computer 105 and is determined as a speed of the vehicle, e.g. the operating speed of the vehicle. The speed threshold may be a maximum speed at which the computer 105 will actuate the countermeasures upon predicting the pollution event. The speed threshold may be any speed such that a vehicle can be below the speed threshold when the vehicle is stopped and/or travelling. When the speed of the first vehicle 101 is below the speed threshold, the computer 105 can actuate the countermeasure after predicting the pollution event.

The countermeasure is actuating one or more of vehicle windows and the climate control system. For example, when the computer 105 predicts a pollution event, the computer 105 can actuate the windows from the open state to the closed state. Additionally, or alternatively, the computer 105 can actuate the climate control system to the recirculate mode, e.g., vents may be closed to seal the passenger cabin from the external environment, when the computer 105 predicts the pollution event. After the pollution event terminates, the computer 105 can actuate the windows to the open state and/or open the climate control system, e.g., the vents, to the environment.

Figure 2:
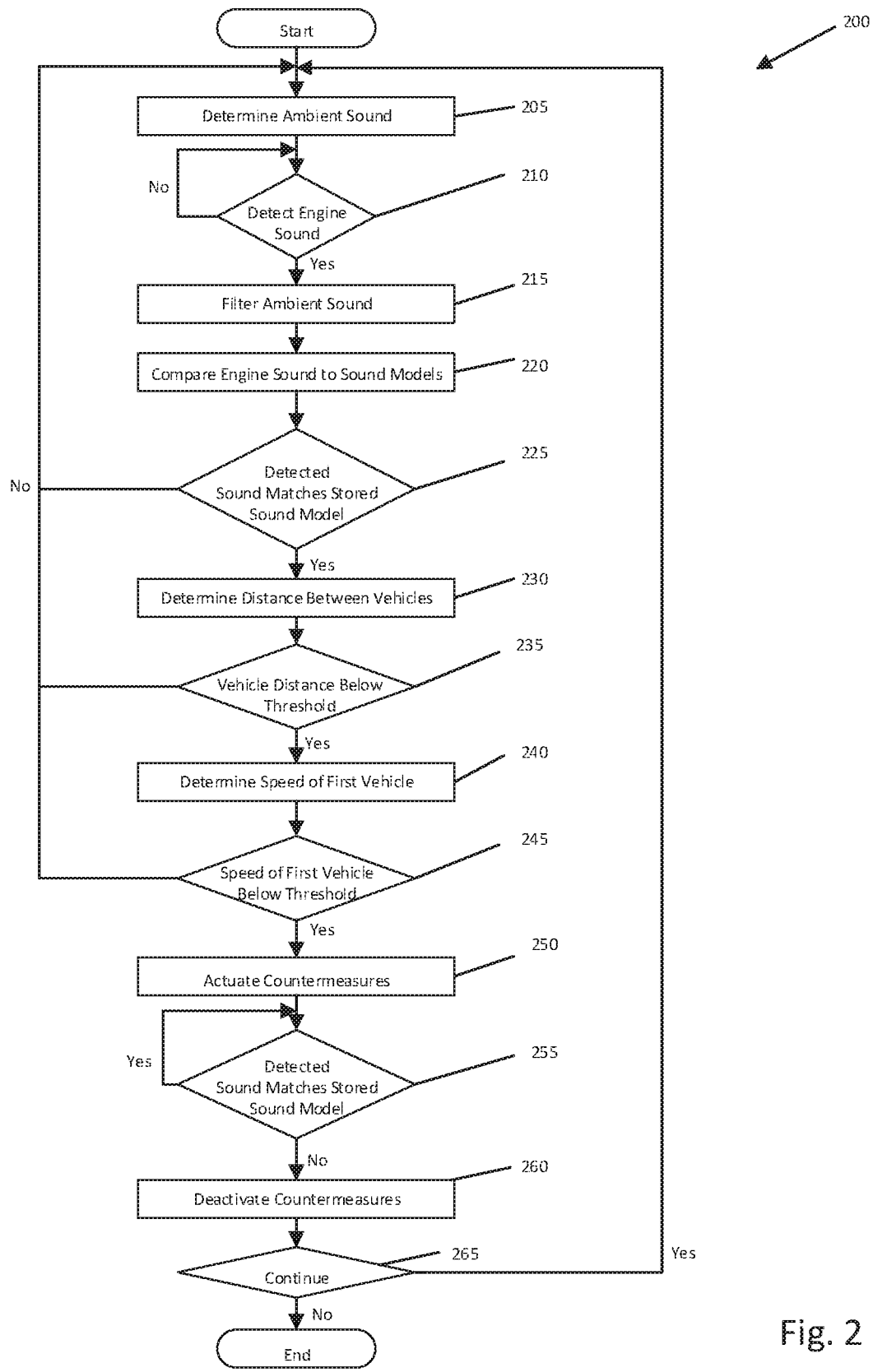
FIG. 2 is an example vehicle pollution detection process.

FIG. 2 illustrates an example process 200 for detecting a sound of a second vehicle engine and predicting a pollution event. The process 200 begins in a block 205, in which the computer 105 determines the ambient sound around a first vehicle 101. As described above, the computer 105 can identify ambient sounds, e.g., environmental sounds, weather sounds, etc., external to the first vehicle 101.

Next, in a block 210, the computer 105 can detect a sound from an engine of a second vehicle. As described above, the microphones 140 can detect the sound from the second vehicle based on the sound characteristics. The microphones 140 can provide a signal to the computer 105 via the vehicle 101 network including the detected sound and the sound characteristics. The computer 105 can determine the sound of the engine, e.g., the specific type of engine, based on the signal, e.g., the sound characteristics of the detected sound.

Next, in a block 215, the computer 105 can filter the ambient sound from the detected sound. As described above, the computer 105 can use audio processing techniques such as are known to remove, i.e., filter, the ambient sound from the detected sound. In other words, the sound characteristics of the ambient sound can be removed from the sound characteristics of the detected sound.

Next, in a block 220, the computer 105 compares the detected sound to the stored sound models. As described above, the computer 105 compares the sound characteristics of the detected sound to the sound characteristics of the stored sound model.

Next, in a block 225, the computer 105 can determine if the detected sound matches a stored sound model. As described above, the computer 105 can compare the detected sound to the stored sound models, e.g., the computer 105 can compare the sound characteristics, e.g., SPL, frequency, etc., of the detected sound to the sound characteristics, e.g., SPL, frequency, etc., of the stored sound model. The computer 105 can determine the detected sound matches (as that term is explained above) a stored sound model if the measured value of the sound characteristics of the detected sound are within a predetermined range, e.g., +/−10%, of the measured value of the sound characteristics of the stored sound model. If the computer 105 determines that the detected sound matches a stored sound model, the process 200 continues to a block 230. Otherwise, the process 200 returns to the block 205.

Next, in a block 230, the computer 105 can determine the distance between the first vehicle 101 and the second vehicle. As described above, the computer 105 can determine the distance between the vehicles based on the SPL of the detected sound. For example, the computer 105 can compare the SPL of the detected sound to the SPL of a stored sound model, and, using the inverse square law, can determine the distance from the first vehicle 101 to the second vehicle.

Next, in a block 235, the computer 105 can determine whether the second vehicle is within a specified distance of the first vehicle 101. As described above, the computer 105 can determine the distance between the first vehicle 101 and the second vehicle based on the sound characteristics of the detected sound. If the computer 105 determines that the second vehicle is within the specified distance of the first vehicle 101, the process 200 continues to a block 240. Otherwise, the process 200 returns to the block 205.

Next in a block 240, the computer 105 can determine the speed of the first vehicle 101. As described above, the computer 105 can determine the speed of the first vehicle 101 based on data 115 received on a communication bus.

Next, in a block 245, the computer 105 can determine whether the speed of the first vehicle 101 is above a speed threshold. As described above, the speed threshold is a value stored in the memory of the computer 105. If the computer 105 determines the speed of the first vehicle 101 is below the speed threshold, the process 200 continues to a block 205. Otherwise, the process 200 returns to the block 205.

Next, in the block 250, the computer 105 can actuate countermeasures. As described above, the countermeasures can include actuating vehicle 101 windows to the closed position, engaging the vehicle 101 climate control system to the recirculate mode, etc. The computer 105 can actuate countermeasures on one or both sides of the vehicle 101. For example, if the computer 105 predicts the pollution event on one side of the vehicle, the computer 105 can actuate countermeasures on the one side of the vehicle 101. The computer 105 can actuate one or more countermeasures based on the predicted pollution event.

Next, in a block 255, the computer 105 can determine whether the detected sound matches the stored sound model to determine whether the pollution event is ongoing, e.g., the pollution event continues to occur after the computer 105 actuated the countermeasures. The computer 105 can compare the sound characteristics, e.g., SPL, frequency, etc., of the detected sound to the sound characteristics of the stored sound model, e.g., SPL, frequency, etc., to determine whether the detected sound matches the stored sound model. As described above, the computer 105 can determine the detected sound matches the stored sound model when the measured value of a sound characteristics of the detected sound is within the predetermined range, e.g., +/−10%, of the measured value of the sound characteristics of a stored sound model. If the computer 105 determines that the detected sound matches a stored sound model, the process 200 remains in the block 255. Otherwise, the process 200 continues to a block 260.

In the block 260, the computer 105 can deactivate the countermeasures. For example, the computer 105 can actuate the windows from the closed position to the open position, actuate the climate control system to communicate with the environment, etc.

Further, in a block 265, which may follow the block 260, a determination is made whether to continue the process 200. For example, the computer 105 could determine to end the process 200, e.g., when the first vehicle 101 is turned off, when the user ends the process 200, etc. However, if the process is to continue, e.g., after deactivating the countermeasures, then the process 200 may return to the block 205, i.e., the process 200 substantially continuously monitors for pollution events external to the first vehicle 101.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 500, one or more of the steps could be omitted, or the steps could be executed in a different order than shown in FIG. 5. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A method executed by a computer, comprising:
    detecting a sound of a second vehicle engine according to sound characteristics, the sound characteristics including at least one of a frequency, an amplitude, an envelope, a spectrum, or a sound pressure level;

determining a distance between a first vehicle and the second vehicle based on the characteristics of the detected sound; and upon predicting a pollution event by comparing the detected sound to a stored sound model, actuating one or more of windows and a climate control system in a first vehicle when the distance is within a specified distance.

2. The method of claim 1, further comprising identifying an ambient sound external to the first vehicle and filtering the ambient sound from the detected sound.

3. The method of claim 2, wherein the ambient sound includes weather sound.

4. The method of claim 1, wherein predicting the pollution event further includes analyzing an image provided by a vehicle image sensor.

5. The method of claim 1, wherein actuating the climate control system includes engaging a recirculate mode, the climate control system is substantially closed to the environment in the recirculate mode.

6. The method of claim 1, further comprising determining the stored sound model according to the sound characteristics of the detected sound and actuating one or more of windows and the climate control system by comparing the detected sound to a threshold provided by the stored sound model.

7. The method of claim 1, further comprising actuating one or more of windows and the climate control system when a vehicle speed of the first vehicle is below a speed threshold.

8. The method of claim 1, wherein the first vehicle includes a plurality of microphones, and the method further comprises, at each microphone, detecting the sound and triangulating a location of the pollution event via the sound detected at each microphone.

9. A system, comprising a computer programmed to:
detect a sound of a second vehicle engine according to sound characteristics, the sound characteristics including at least one of a frequency, an amplitude, an envelope, a spectrum, or a sound pressure level;
determine a distance between a first vehicle and the second vehicle based on the characteristics of the detected sound; and
upon predicting a pollution event by comparing the detected sound to a stored sound model, actuate one or more of windows and a climate control system in a first vehicle when the distance is within a specified distance.

10. The system of claim 9, wherein the computer is further programmed to identify an ambient sound external to the first vehicle and filtering the ambient sound from the detected sound.

11. The system of claim 10, wherein the ambient sound includes weather sound.

12. The system of claim 9, wherein the computer is further programmed to predict the pollution event by analyzing an image provided by a vehicle image sensor.

13. The system of claim 9, wherein actuating the climate control system includes engaging a recirculate mode, the climate control system is substantially closed to the environment in the recirculate mode.

14. The system of claim 9, wherein the computer is further programmed to determine the stored sound model according to the sound characteristics of the detected sound and actuating one or more of windows and the climate control system by comparing the detected sound to a threshold provided by the stored sound model.

15. The system of claim 9, wherein the computer is further programmed to actuate one or more of windows and the climate control system when a vehicle speed of the first vehicle is below a speed threshold.

16. The system of claim 9, wherein the first vehicle includes a plurality of microphones, and the computer is further programmed to, at each microphone, detect the sound and triangulate a location of the pollution event via the sound detected at each microphone.

17. A system, comprising a computer programmed to:
detect a sound of a second vehicle engine according to sound characteristics, the sound characteristics including at least one of a frequency, an amplitude, an envelope, a spectrum, or a sound pressure level; and
upon predicting a pollution event by comparing the detected sound to a stored sound model, actuating one or more of windows and a climate control system in a first vehicle when a vehicle speed of the first vehicle is below a speed threshold.

18. The system of claim 17, wherein actuating the climate control system includes engaging a recirculate mode, the climate control system is substantially closed to the environment in the recirculate mode.

19. The system of claim 17, wherein the computer is further programmed to determine the stored sound model according to the sound characteristics of the detected sound and actuating one or more of windows and the climate control system by comparing the detected sound to a threshold provided by the stored sound model.

20. The system of claim 17, wherein the computer is further programmed to predict the pollution event by analyzing an image provided by a vehicle image sensor.

* * * * *